United States Patent
Watts

(10) Patent No.: US 7,475,903 B2
(45) Date of Patent: Jan. 13, 2009

(54) WEIGHT BASED OCCUPANT CLASSIFICATION SYSTEM

(75) Inventor: Russell C. Watts, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 592 days.

(21) Appl. No.: 11/102,054

(22) Filed: Apr. 8, 2005

(65) Prior Publication Data

US 2006/0226641 A1    Oct. 12, 2006

(51) Int. Cl.
*B60R 21/16* (2006.01)
(52) U.S. Cl. .................................................. 280/735
(58) Field of Classification Search ................ 280/735; 180/271, 273
See application file for complete search history.

(56) References Cited

U.S. PATENT DOCUMENTS

| | | | |
|---|---|---|---|
| 5,821,633 A | 10/1998 | Burke et al. | |
| 6,065,786 A | 5/2000 | Wheatley | |
| 6,246,936 B1 * | 6/2001 | Murphy et al. | 701/45 |
| 6,636,792 B2 | 10/2003 | Lichtinger et al. | |
| 6,771,175 B1 | 8/2004 | Eagle et al. | |
| 6,808,200 B2 | 10/2004 | Drobny et al. | |
| 6,823,959 B2 | 11/2004 | Winkler et al. | |
| 6,876,912 B2 * | 4/2005 | Winkler | 701/45 |
| 6,889,129 B2 * | 5/2005 | Suzuki et al. | 701/45 |
| 7,151,452 B2 * | 12/2006 | Shieh | 340/561 |
| 7,163,075 B2 * | 1/2007 | Gray | 180/273 |
| 7,295,910 B2 * | 11/2007 | Sakai et al. | 701/45 |
| 2002/0120379 A1 | 8/2002 | Oestreicher et al. | |
| 2003/0001367 A1 | 1/2003 | Curtis | |
| 2003/0083795 A1 | 5/2003 | Stanley | |
| 2003/0163234 A1 | 8/2003 | Olsen et al. | |
| 2003/0209893 A1 | 11/2003 | Breed et al. | |
| 2004/0006418 A1 | 1/2004 | Sakai | |
| 2004/0016577 A1 | 1/2004 | Lichtinger et al. | |
| 2004/0032118 A1 | 2/2004 | Kojima et al. | |
| 2004/0045758 A1 | 3/2004 | Breed et al. | |
| 2004/0073347 A1 | 4/2004 | Winkler | |
| 2004/0080425 A1 | 4/2004 | Sullivan et al. | |
| 2004/0129478 A1 | 7/2004 | Breed et al. | |
| 2004/0231906 A1 | 11/2004 | Theiss et al. | |
| 2004/0232674 A1 | 11/2004 | Winkler et al. | |
| 2005/0017488 A1 | 1/2005 | Breed et al. | |
| 2005/0023064 A1 | 2/2005 | Lich et al. | |
| 2005/0077710 A1 | 4/2005 | Schmied et al. | |

* cited by examiner

*Primary Examiner*—Faye M. Fleming
(74) *Attorney, Agent, or Firm*—Michael Best & Friedrich LLP

(57) ABSTRACT

A system and method of classifying an occupant in a seat. The system can include a plurality of sensors, and each sensor can be configured to produce an output related to a weight of an object in a seat of the vehicle. A controller can be configured to receive the output of each of the sensors when an occupant is in the seat, and perform a maximum likelihood ratio test to provide a signal indicative of the classification of the occupant. The maximum likelihood ratio test can incorporate the output of each sensor relating to the occupant, and can further incorporate data sets related to the outputs of each of the sensors in response to a plurality of test cases, for a specific class of occupants.

28 Claims, 5 Drawing Sheets

WEIGHT BASED OCCUPANT CLASSIFICATION SYSTEM

BACKGROUND

Embodiments of the invention relate to methods and devices for classifying occupants of a vehicle.

Many vehicles include airbags and seatbelt tensioning systems that work together to protect vehicle occupants from experiencing injuries due to collisions.

One way to control airbag deployment is to monitor the weight and position of the seat occupant. Weight information and position information can be used to classify seat occupants into various groups, e.g., adult, child, infant, etc., to control the deployment force of the airbag.

There are many different systems for measuring weight and determining the position of a seat occupant. These systems use sensors placed in various locations within the vehicle to monitor the position and weight of the occupants. For example, a vehicle may include transducers mounted within the seat to measure occupant weight and optical sensors mounted to the dashboard to determine the position of the occupant. Information from the sensors is processed by a processor, such as a computer, and the occupant is classified. Airbag deployment is then controlled based on this classification.

SUMMARY

Although existing systems are functional, they are not completely satisfactory. The inventors have learned that components in restraint systems such as belt tensioning systems can transfer loads to weight sensors, causing an effective change in measured weight. If that change in weight is sufficiently large, there can be a class overlap between determined groups. When such load transfers occur, differentiating between different classes of individuals can be difficult.

In light of the impact that load transfers can have, there is a need for improved methods and systems of classifying vehicle occupants. The following summary sets forth certain embodiments of such methods and systems. However, it does not set forth all such embodiments and should in no way be construed as limiting of any particular embodiment.

One embodiment of the invention generally includes an occupant classification system for a vehicle. The occupant classification system can include a controller and a plurality of sensors that are in communication with the controller. The controller can be configured to receive the output of each of the sensors when an occupant is in the seat, and perform a maximum likelihood ratio test ("MLRT") in a MLRT module to provide a signal indicative of the classification of the occupant. The controller can also be configured to transmit classification information from the MLRT module to other vehicle systems.

In another form, the controller can be configured to organize the output of each sensor relating to the occupant into a data set. Data sets related to the response of the sensors in a plurality of test cases to make a classification decision can also be formed and stored within controller memory. The MLRT module can then utilize the stored data sets to make a decision between occupants that have a class overlap.

In another form, the invention provides a method of classifying an occupant in a seat of a vehicle. The method can include steps which obtain data sets related to several classes of occupants in a variety of test conditions, as well as obtain a data set of information from a plurality of sensors. The multiple data sets can be utilized by the MLRT module test to make a classification decision.

Other features and advantages of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

As should also be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Thus, the claims should not be limited to the specific examples or terminology or to any specific hardware or software implementation or combination of software or hardware.

Embodiments of the invention relate to an occupant classification system in a vehicle. The occupant classification system can characterize an occupant of a vehicle under a plurality of conditions. It should be noted that the term occupant could be used to describe both animate and inanimate objects.

Figure 1:
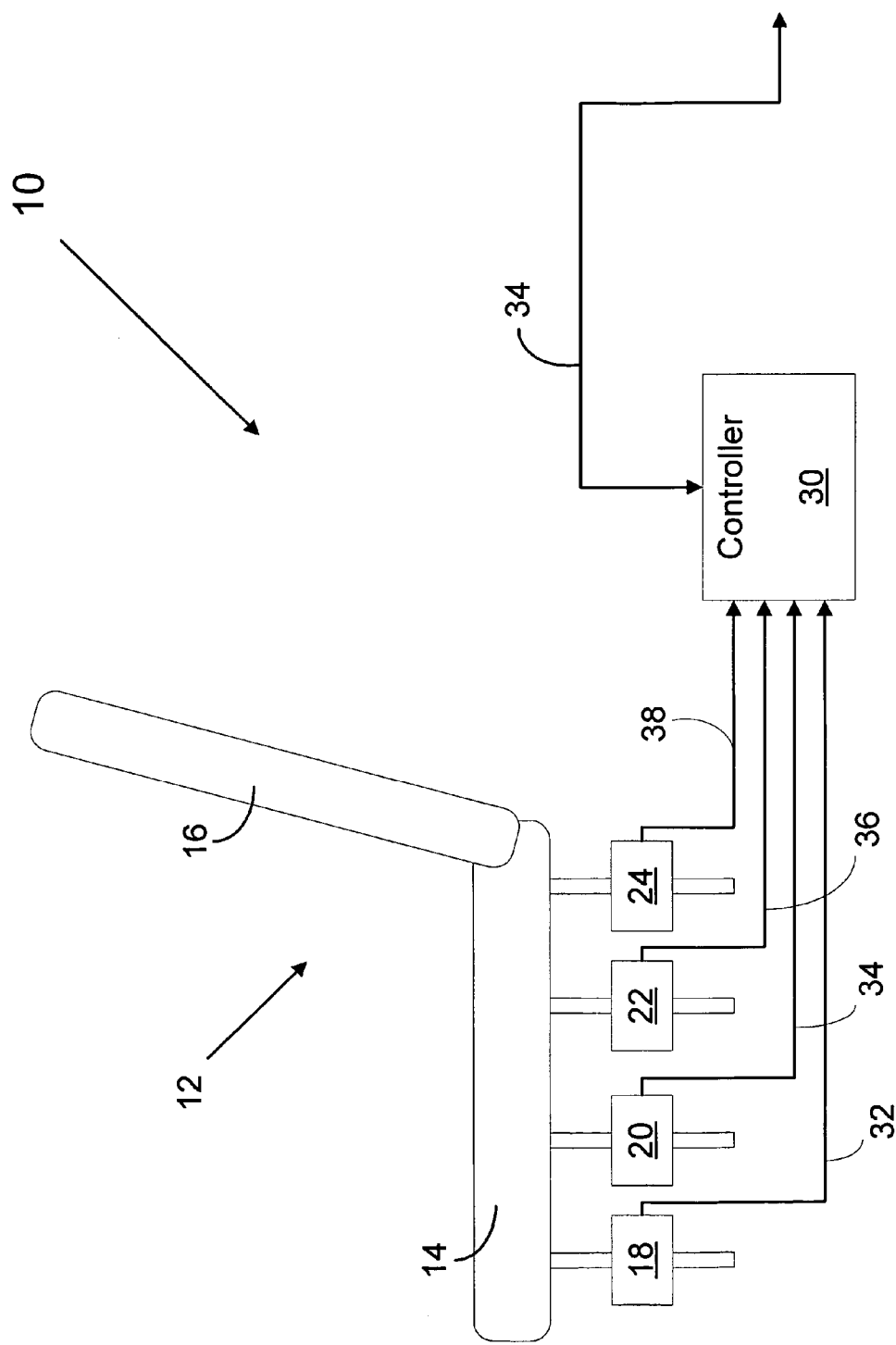
FIG. 1 is an exemplary embodiment of a vehicle seat with weight sensors.

FIG. 1 illustrates an exemplary occupant monitoring system 10. The system 10 includes a seat 12 having a seat bottom 14 and a seat back 16. A plurality of weight sensors 18, 20, 22, and 24 are positioned at various locations around the seat bottom 14. Each of the sensors 18-24 communicates with a controller 30 through a link. In the embodiment shown, links 32, 34, 36, and 38 connect the sensors 18-24 to the controller 30. The positioning of the sensors is discussed in greater detail below. Information from the sensors 18-24 and provided to the controller 30 is used to classify an occupant in the seat 12. In one embodiment, the controller is also pre-programmed or loaded with certain information including statistical data of occupants compiled from various test cases. The statistical data can be used with a controller program (the features of which are discussed in greater detail) to monitor the occupant in the seat 12. The controller 30 uses the monitoring information from the plurality of sensors located around the seat bottom 14 to perform tests that classify an occupant in the seat 12. After classifying the occupant in the seat 12, the controller 30 can relay the classification information to another vehicle system (such as an airbag system, belt tensioner, or the like). In the embodiment shown, the controller 30 is linked to other vehicle systems with an information bus 34. The information bus 34 can be used to transmit and receive information, and could include both wired and wireless connections.

Figure 2:
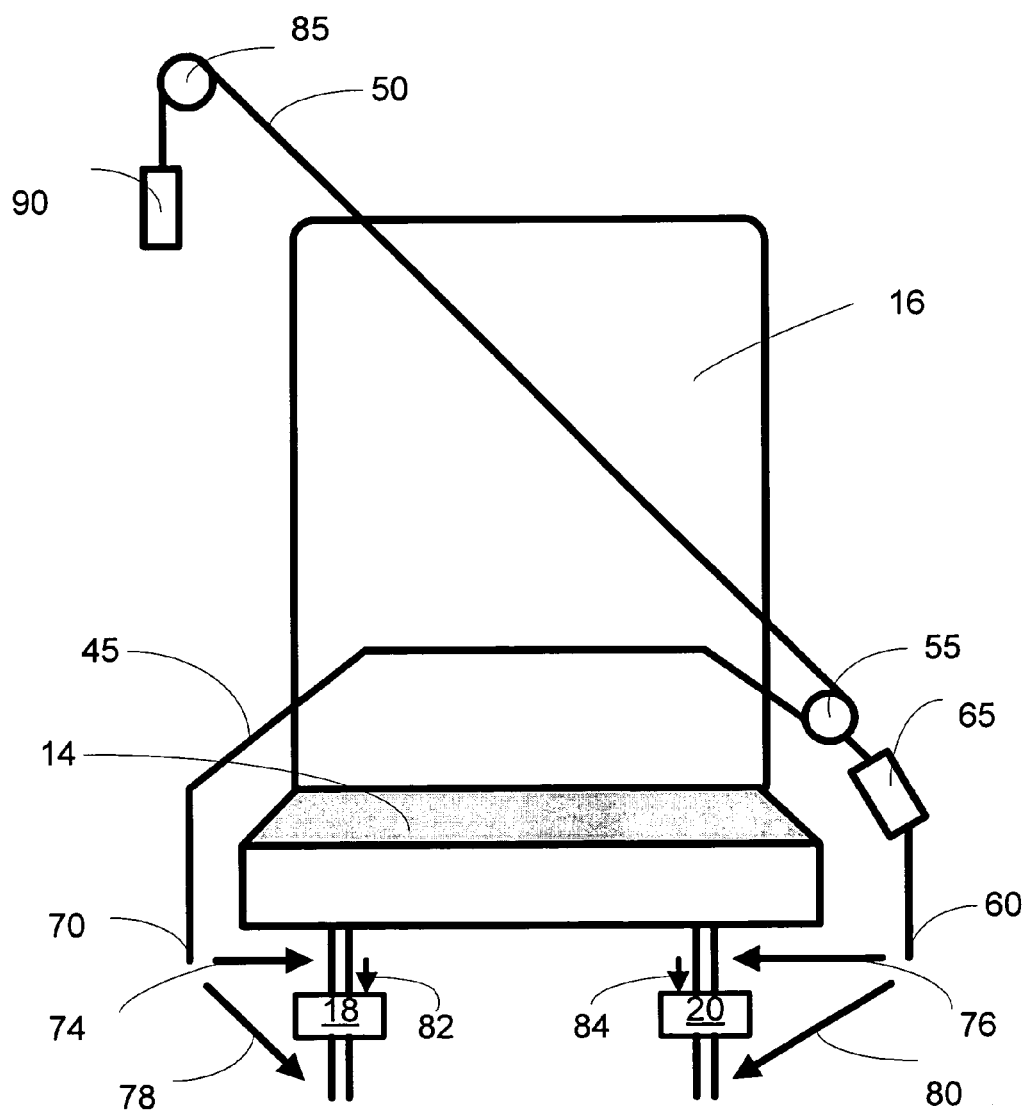
FIG. 2 is a detailed view of the exemplary vehicle seat of FIG. 1 with a seat belt system.

FIG. 2 shows the seat 12 in greater detail, and with a seat belt system 40. The seat belt system 40 can be configured differently depending on the configuration of or application for the seat 12. In the embodiment shown, the seat belt system 40 includes a lap belt 45 and a shoulder belt 50. (A two, four, or five point belt system might also be used.) The lap belt 45 and shoulder belt 50 are connected by a buckle 55. The buckle 55 is used to secure the lap belt 45 and the shoulder belt 50 to a first attachment point 60 with a clasp 65. The lap belt 45 is secured by a second attachment point 70 on the opposite side of the seat 12. The first and second attachment points 60, 70 can be secured to the vehicle in a variety of places depending on the configuration of the seat 12. In the embodiment shown, there are upper attachment point locations 74, 76 and lower attachment point locations 78, 80 that indicate possible areas to which the first and second attachment points 60, 70 can be secured. The upper attachment point locations 74, 76 are positioned above the weight sensors 18, 20, while the lower attachment point locations 78, 80 are positioned below the weight sensors 18, 20.

The output signal of the weight sensors 18, 20 can be affected by the places that the attachment points 60, 70 are secured. The shoulder belt 50 is configured in the embodiment shown to be routed over a support 85, and secured in a reactor 90. The reactor 90 includes an internal belt tensioning system that senses load transfer, and responds in an according manner. The reactor 90 can also have an effect on the output signals of the weight sensors 18, 20. The exemplary embodiment illustrates some of the possible ways that the occupant classification sensors can be affected, but the effects are not limited to these specific cases. In other embodiments, occupant sensors could be affected by seat belt equipment not shown in the figure (i.e., other tensioning systems, different belt configurations, modified buckle and clasp arrangements, and the like) and could be affecting a single occupant sensor or a plurality of occupant sensors.

The pre-programmed or pre-loaded occupant classification information used in certain embodiments can be collected by conducting a variety of tests. In one exemplary embodiment, test information is collected in a controlled manner using a vehicle car seat and test subjects. Using four weight sensors, information regarding the test subjects is gathered in a plurality of test conditions. The test subjects vary in actual weight and the vehicle seat is configured in a variety of positions. Seat belt systems of different configurations (i.e., different seat belt anchor points, different seat belt tensioners, and different reactors) are also used. In other embodiments, alternative test information concerning occupant classification is collected and stored (e.g., different sensor configurations, different seat configurations, and different test subjects).

Figure 3:
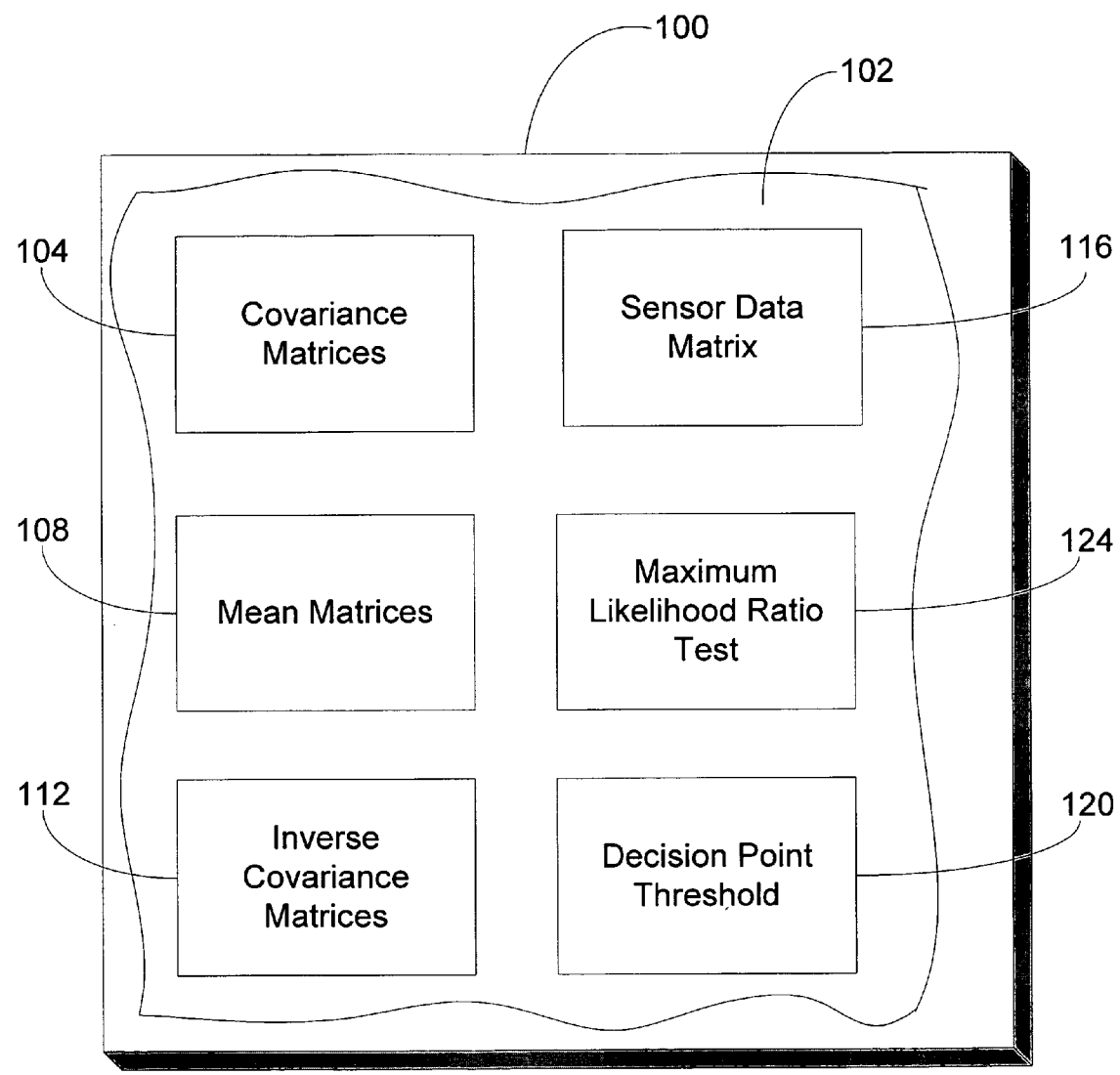
FIG. 3 is an exemplary controller configuration.

FIG. 3 shows one embodiment of a configuration of a controller 100. The controller 100 can be configured differently depending on system memory, processor capabilities, and input/output devices. In the exemplary embodiment illustrated, the controller 100 has data sets within a memory 102 including covariance matrices 104, mean matrices 108, inverse covariance matrices 112, senor data matrices 116, and a decision point threshold 120. The memory 102 also includes a set of executable instructions referred to as a maximum likelihood ratio test ("MLRT") module 124. As one of ordinary skill in the art would recognize, the blocks 104-124 are visual representations of data and instructions stored within memory 102.

The covariance matrices 104, mean matrices 108, and inverse covariance matrices 112 are data sets that originate from occupant classification information. An exemplary matrix of occupant classification information is illustrated below:

$$\begin{pmatrix} w_{11} & w_{12} & w_{13} & \ldots w_{1n} \\ w_{21} & w_{22} & w_{23} & \ldots w_{2n} \\ w_{31} & w_{32} & w_{33} & \ldots w_{3n} \\ w_{41} & w_{42} & w_{43} & \ldots w_{4n} \end{pmatrix}$$

where n represents the number of tests performed, and w represents the weights of the test subjects. Each test performed (e.g., female in seat with seat back upright) has a corresponding column, while the rows of the matrix correspond to each weight sensor reading. A plurality of matrices can be compiled and stored in the controller 100, which are representative of defined test case groups. For example, in some embodiments test case groups could be defined by age (i.e., infant, 1-3 year old, 6 year old, child 6-12, young adult 12-16 etc.) or defined by weight (i.e., weight of an occupant compared with a reference average weight). In other embodiments definitions of test case groups can be any suitable distinction.

In the exemplary embodiment illustrated there are four weight sensors 18-24 used, and hence, there are four rows depicted. A person skilled in the art could perform operations on the matrix data to create mean matrices, covariance matrices, and inverse covariance matrices. In the exemplary embodiment shown, a mean matrix is a four element by one element matrix that corresponds to the average of n test cases for each weight sensor 18-24. Covariance and inverse covariance matrices are evaluated to matrices 4 elements by 4 elements in size by utilizing processes commonly known in the art. The covariance matrices 104, mean matrices 108, and inverse covariance matrices 112 can be used by the controller 100 in conjunction with processing carried out by the MLRT module 124 to help determine a classification in circumstances where data initially falls within a window or area where classes overlap. Such overlaps are discussed in greater detail below with respect to FIG. 5.

A better understanding of the MLRT can be obtained by examining the following equation:

$$\frac{1}{2}(R^T - m_0^T)Q_0(R - m_0) -$$

-continued $$\frac{1}{2}(R^T - m_1^T)Q_1(R - m_1) \underset{H_1}{\overset{H_0}{\gtrless}} \ln(\eta) + \frac{1}{2}\ln|K_1| - \frac{1}{2}\ln|K_0|$$

Each of the variables can represent data that has been stored in, or passed to the controller 100. In the equation shown, the R represents values from the weight sensor outputs. In the exemplary embodiment, R represents the weight related output signals corresponding to the four output sensors 18-24. The variable R can be continuously updated with new weight sensor readings as they become available according to a scan time or refresh rate of the controller 100. The variables $m_0$ and $m_1$ represent the previously described mean matrices 108 for a first test case group and a second test case group respectively (e.g., females in the lower fifth percentile of average female weight ("fifth percentile females") and 6 year old children). The superscript T is an indication that the matrix is transposed. The variables $K_0$ and $K_1$ represent the previously described covariance matrices 104 for the two different test case groups, and the variables $Q_0$ and $Q_1$ represent the inverse matrices of the covariance matrices $K_0$ and $K_1$, respectively. The variables $H_0$ and $H_1$ represent a first decision $H_0$ and a second decision $H_1$ that each correspond to one of the test group cases. The variables $H_0$ and $H_1$ are used as a decision point, for example, if the computed left side of the equation is greater than that of the computed right side of the equation, the decision variable $H_0$ can be chosen to represent the first test case group or class. However, if the computed left side of the equation is less than the computed right side of the equation, the decision variable $H_1$ can be chosen to represent the second test case group or class. The variable $\eta$ is a minimum error term and is equivalent to one in the embodiment shown.

Figure 4:
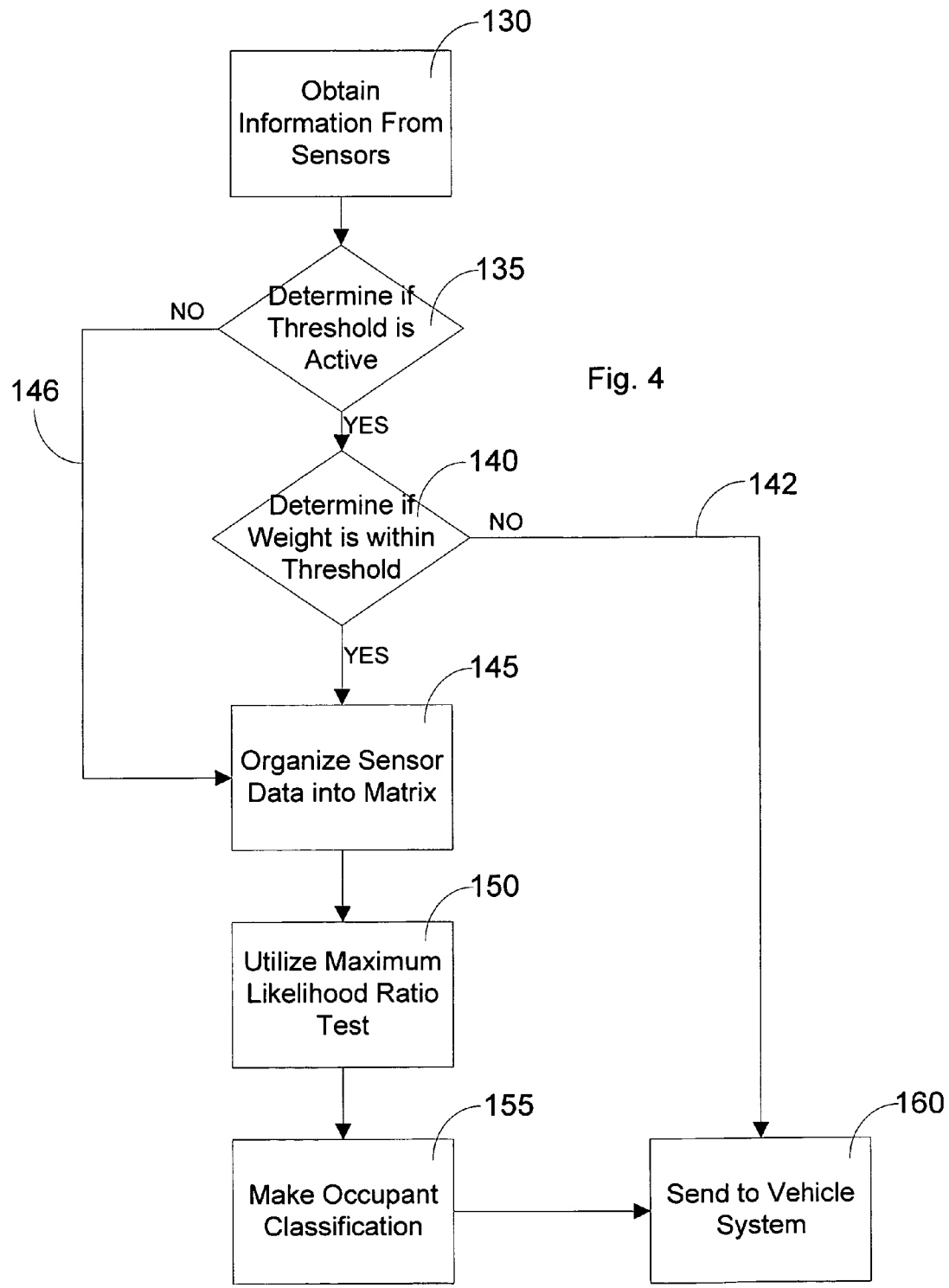
FIG. 4 is an exemplary flow chart of processes carried out by software and/or hardware in certain embodiments.

FIG. 4 is an exemplary flowchart that illustrates possible operation steps, depicted as blocks, of the controller 100 (as dictated, for example, by software executed by the controller or the architecture of hardware comprising the controller, or a combination of both). In the embodiment shown, the controller obtains information from a plurality of sensors (block 130). The information obtained from the plurality of sensors is indicative of the weight of an object (generally presumed to be an occupant) in the seat 12. The weight information from the sensors is passed to the controller 100 as sensor data to be used in subsequent operation steps. The controller 100 can be configured to utilize a threshold. Thus, after information from the sensors is obtained, the controller 100 determines if a weight threshold has been established or is active (block 135). A threshold may be used to filter or pre-process information in certain circumstances. For example, if a certain threshold weight has not been sensed (e.g., a weight between 70 and 120 pounds) detailed analysis of the information from the sensors may be unnecessary. An assumption could be made that any sensed weights outside of this range may be classified without processing information in the MLRT module 124.

If a threshold is active, the controller then determines if the sensed information is within (or, in some cases, whether the data exceeds) the threshold (block 140). If the threshold conditions have not been met, the information is sent directly to vehicle systems that can use the information (as shown by path 142). If the threshold conditions are met, the controller organizes sensor data into a matrix (block 145). The sensor data is also organized into a sensor data matrix if the threshold is not active (as shown by path 146).

After organizing the data in a matrix (block 145), the controller 100 processes data to the MLRT module (block 150), and generates or determines an occupant classification decision (block 155). The classification decision is then sent to another vehicle system (as shown at block 160).

In the embodiment shown, the MLRT module 124 is configured to utilize the previously described matrix data 104-112, along with the newly formed sensor data matrix 116 to make an occupant classification decision (block 155). As noted, the occupant classification decision can then be sent to another vehicle system such as an airbag system) to control its operation (e.g., to suppress, or control the level of deployment of an airbag). In other embodiments, the controller 100 can be configured differently to produce similar results using a different organization of steps.

Figure 5:
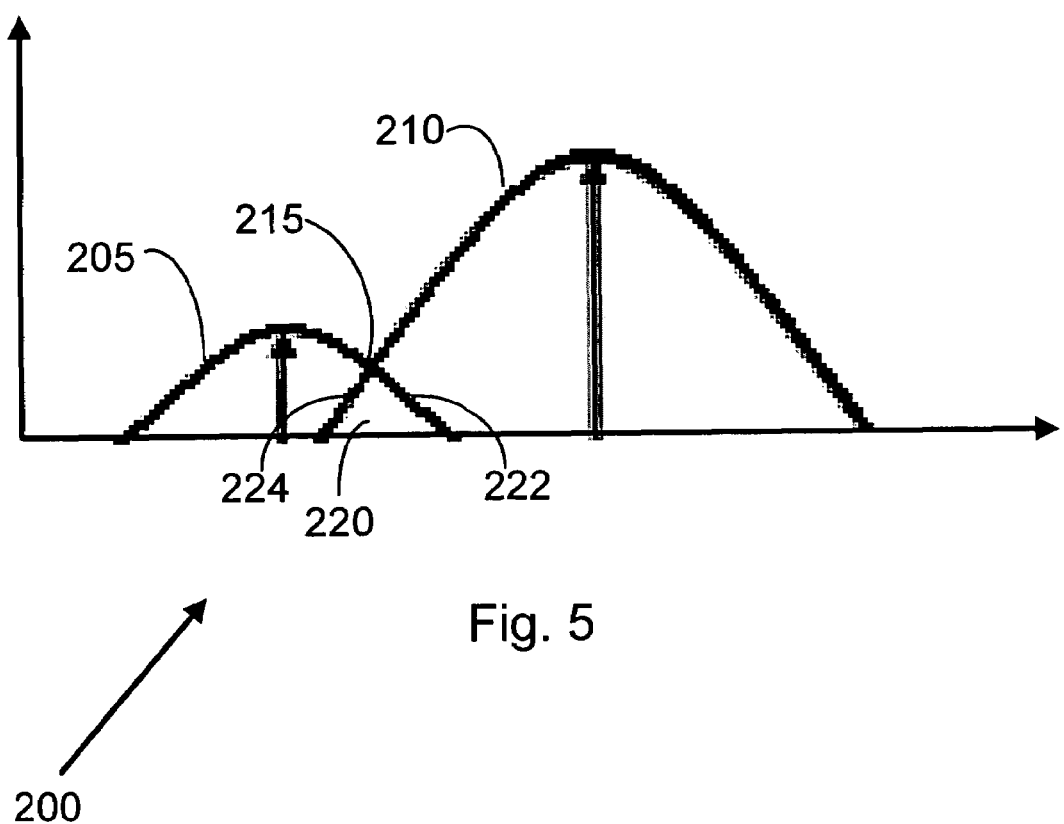
FIG. 5 is an exemplary plot of the weights of two occupant classes.

FIG. 5 is an exemplary embodiment of a plot 200 of two groups of test cases. In the embodiment shown, a first natural distribution plot 205 of the weights of for typical 6 year old children is displayed on the left, and a second natural distribution plot 210 of fifth percentile females is displayed on the right. Vehicle systems (e.g., airbag deployment systems) can be configured to operate differently depending on the classification of an occupant in a seat. In the exemplary embodiment shown, the airbag deployment system can be configured to be suppressed if a 6 year old child is in the seat, and configured to deploy if a fifth percentile female is in the seat. However, the two plots illustrate where the classes of 6 year old children and fifth percentile children overlap.

The plots intersect at a point 215, and have an overlap area 220 bounded by segments 222 and 224 of the plots 205 and 210, respectively. The overlap area 220 represents a range of weights that could be included in the distribution of weights for multiple test case groups. As should be understood, other test groups may have similar class overlaps. The MLRT module helps better classify occupants when the data received from the sensors falls within the overlap area 220.

Various features and advantages of the invention are set forth in the following claims.

What is claimed is:

1. An occupant classification system for a vehicle, the system comprising:
    a plurality of sensors, each sensor configured to produce an output related to a characteristic of an occupant in a seat of the vehicle; and
    a controller configured to receive the output of each of the sensors and to perform a maximum likelihood ratio test to provide a signal indicative of the classification of the occupant, wherein the maximum likelihood ratio test incorporates the output of each individual sensor relating to the occupant, and further incorporates a mean and a covariance of each of a pair of data sets, wherein each data set is related to a specific class and includes the outputs of each of the sensors in response to a plurality of test cases.

2. The occupant classification system of claim 1, wherein the output signal of the sensors is indicative of a weight of the occupant in the seat.

3. The occupant classification system of claim 1, wherein the plurality of test cases includes various belt tension conditions and the maximum likelihood ratio test accounts for the various belt tension conditions on the occupant.

4. The occupant classification system of claim 1, wherein the plurality of test cases includes various belt anchor point positions and the maximum likelihood ratio test accounts for the various belt anchor point position conditions on the occupant.

5. The occupant classification system of claim 1, wherein the plurality of test cases includes various seat positions and the maximum likelihood ratio test accounts for the various seat position conditions on the occupant.

6. The occupant classification system of claim 1, wherein the controller is configured to utilize a threshold, said threshold filtering information from subsequent controller operations under predetermined conditions.

7. The occupant classification system of claim 1, wherein the controller is configured to be in communication with a vehicle system.

8. The occupant classification system of claim 7, wherein the vehicle system is an airbag deployment system.

9. The occupant classification system of claim 1, wherein the signal indicative of the classification of the occupant is used to distinguish occupants of test cases that have a class overlap.

10. A method for classifying an occupant in a seat of a vehicle, comprising:
providing a plurality of sensors, wherein each sensor provides an output related to a characteristic of an occupant in the seat;
obtaining a first data set including the outputs from each sensor under a plurality of test cases representing a first class of occupants, and further computing from the first data set a covariance and a mean;
obtaining a second data set including the outputs from each sensor under a plurality of test cases representing a second class of occupants, and further computing from the second data set a covariance and a mean;
obtaining the outputs from each individual sensor; and
using a maximum likelihood ratio test to classify the occupant, wherein the maximum likelihood ratio test incorporates the outputs from each individual sensor, the covariance and the mean of the data set relating to the first class of occupants, and the covariance and the mean of the data set relating to the second class of occupants.

11. The method of claim 10, wherein the covariance and mean relating to the first class, the covariance and mean relating to the second class, and the outputs from each individual sensor relating to the occupant are expressed as matrices.

12. The method of claim 11, wherein if the number of sensors is p, then the covariance matrix for the data set for the first class has dimensions of p by p, and the mean matrix for the data set for the first class has dimensions of 1 and p.

13. The method of claim 10, wherein the plurality of test cases representing a first class of occupants includes various belt tension conditions and the maximum likelihood ratio test accounts for the various belt tension conditions on the occupant.

14. The method of claim 10, wherein the plurality of test cases representing a first class of occupants includes various belt anchor point positions and the maximum likelihood ratio test accounts for the various belt anchor point position conditions on the occupant.

15. The method of claim 10, wherein the plurality of test cases representing a first class of occupants includes various seat positions and the maximum likelihood ratio test accounts for the various seat position conditions on the occupant.

16. The method of claim 10, further comprising filtering information from subsequent controller operations under predetermined conditions.

17. The method of claims 10, further comprising delivering classification information to an airbag deployment system.

18. An occupant classification system for a vehicle, the system comprising:
a plurality of sensors, each sensor configured to produce an output related to a weight of an occupant in a seat of a vehicle;
a controller configured to receive the output of each of the sensors and to arrange the outputs into a matrix, the controller further configured with a plurality of matrices of pre-stored data, at least a portion of the pre-stored data related to mechanical loading caused by occupant restraints, and to perform a maximum likelihood ratio test using the matrix of outputs of the plurality of sensors and the matrices of pre-stored data;
wherein the matrices of pre-stored data include a mean matrix and a covariance matrix related to a plurality of classes of occupants.

19. The occupant classification system of claim 18, wherein at least a portion of the pre-stored data is related to mechanical loading caused by belt tensioning systems.

20. The occupant classification system of claim 18, wherein at least a portion of the pre-stored data is related to mechanical loading caused by the configuration of seat belt anchor points.

21. The occupant classification system of claim 18, wherein at least a portion of the pre-stored data is related to mechanical loading caused by varying seat positions.

22. The occupant classification system of claim 18, wherein the controller is configured to utilize a threshold, said threshold filtering information from subsequent controller operations.

23. The occupant classification system of claim 18, wherein the controller is configured to be in communication with a vehicle system.

24. The occupant classification system of claim 23, wherein the vehicle system is an airbag deployment system.

25. The occupant classification system of claim 18, wherein the maximum likelihood ratio test is used to provide a signal indicative of the classification of the occupant.

26. The occupant classification system of claim 25, wherein the signal indicative of the classification of the occupant is used to distinguish occupants of test cases that have a class overlap.

27. A method for classifying an occupant in a seat of a vehicle, comprising:
providing a plurality of sensors, wherein each sensor provides an output related to a weight of an occupant in the seat;
obtaining a plurality of data sets, the plurality of data sets including the outputs from each sensor under a plurality of test cases representing a plurality of classes of occupants;
obtaining the outputs indicative of the weight of the occupant from each individual sensor; and
using a maximum likelihood ratio test to classify the occupant, wherein the maximum likelihood ratio test incorporates the outputs from each individual sensor relating to the weight of the occupant, at least a portion of the data sets relating to the weights of the occupants of the plurality of test cases, and a mean matrix and a covariance matrix for each of the portion of the data sets related to the plurality of classes of occupants.

28. The method of claim 22, wherein the ratio test provides a classification that distinguishes occupants of test cases that have a class overlap.

* * * * *